US011258932B1

(12) United States Patent
Tylicki

(10) Patent No.: US 11,258,932 B1
(45) Date of Patent: Feb. 22, 2022

(54) UNIVERSAL RETROFIT LIGHT MOUNTING BOX WITH AUDIO/VIDEO FUNCTIONS

(71) Applicant: HeathCo LLC, Bowling Green, KY (US)

(72) Inventor: Scott Blaise Tylicki, Bowling Green, KY (US)

(73) Assignee: HEATHCO LLC, Bowling Green, KY (US)

( * ) Notice: Subject to any disclaimer, the term of this patent is extended or adjusted under 35 U.S.C. 154(b) by 0 days.

(21) Appl. No.: 16/875,608

(22) Filed: May 15, 2020

(51) Int. Cl.
| | | |
|---|---|---|
| *H04N 5/225* | (2006.01) | |
| *F21S 8/00* | (2006.01) | |
| *F21V 23/06* | (2006.01) | |
| *F21V 23/04* | (2006.01) | |
| *F21V 33/00* | (2006.01) | |
| *H02G 3/16* | (2006.01) | |
| *H04N 5/232* | (2006.01) | |
| *H04N 7/18* | (2006.01) | |
| *H02G 3/08* | (2006.01) | |
| *F21Y 115/10* | (2016.01) | |
| *F21V 23/00* | (2015.01) | |
| *F21W 121/00* | (2006.01) | |

(52) U.S. Cl.
CPC ............ *H04N 5/2256* (2013.01); *F21S 8/033* (2013.01); *F21V 23/0435* (2013.01); *F21V 23/0442* (2013.01); *F21V 23/06* (2013.01); *F21V 33/0056* (2013.01); *H02G 3/083* (2013.01); *H02G 3/16* (2013.01); *H04N 5/2252* (2013.01); *H04N 5/23203* (2013.01); *H04N 7/183* (2013.01); *F21V 23/003* (2013.01); *F21W 2121/004* (2013.01); *F21Y 2115/10* (2016.08)

(58) Field of Classification Search
CPC .... H04N 5/2256; H04N 5/2252; H04N 7/183; F21S 8/033; F21V 23/0435; F21V 23/0442; F21V 23/06; F21V 33/0056; H02G 3/083; H02G 3/16
See application file for complete search history.

(56) References Cited

U.S. PATENT DOCUMENTS

| | | | | |
|---|---|---|---|---|
| 7,985,017 | B2 * | 7/2011 | Quan | F21S 8/033 |
| | | | | 362/659 |
| 9,172,199 | B2 * | 10/2015 | Birdwell | H01R 24/70 |
| 10,062,256 | B1 | 8/2018 | Skotty et al. | |
| 10,520,177 | B2 * | 12/2019 | Bailey | F21V 17/02 |
| D887,060 | S * | 6/2020 | Wang | D26/63 |
| 10,827,574 | B1 * | 11/2020 | Fu | F21S 8/033 |
| 10,887,958 | B1 * | 1/2021 | Fu | F21S 8/033 |

(Continued)

FOREIGN PATENT DOCUMENTS

| | | |
|---|---|---|
| CA | 2898528 A1 | 1/2016 |
| CA | 2845210 C | 10/2017 |

*Primary Examiner* — Bryon T Gyllstrom
(74) *Attorney, Agent, or Firm* — Middleton Reutlinger

(57) ABSTRACT

A universal light mounting box for retrofit is described. The retrofit light mounting box attaches to a junction box and receives electrical power from the junction box cables. The mounting box includes a canopy housing and a camera housing to provide wireless communication of both audio and video capabilities for the area around the junction box while also providing controlled power to a light fixture which is attached to the mounting box. A depending camera housing provides both audio and video signals which can be transmitted from the retrofit canopy housing electronics to a user's device.

21 Claims, 8 Drawing Sheets

(56) References Cited

U.S. PATENT DOCUMENTS

| | | | |
|---|---|---|---|
| 2001/0033487 A1* | 10/2001 | Crelin | F21V 21/02 |
| | | | 362/147 |
| 2016/0286607 A1* | 9/2016 | Mishra | G06Q 50/265 |
| 2018/0191930 A1* | 7/2018 | Jeong | H04N 5/2252 |
| 2018/0263098 A1 | 9/2018 | Recker et al. | |
| 2019/0289262 A1* | 9/2019 | Harms | H04W 4/02 |

\* cited by examiner

UNIVERSAL RETROFIT LIGHT MOUNTING BOX WITH AUDIO/VIDEO FUNCTIONS

BACKGROUND

Electrical light fixtures or luminaire systems are known in the industry. Examples of such light systems include indoor or outdoor light fixtures, of which there are several different styles and which include both functional and decorative aspects. For example, an outdoor security light may include a light fixture for providing a wide lighting distribution around a building. Such security lighting may also include one or more sensors, such as light sensors and/or motion sensors, which may cause the lighting control electronics to illuminate the light fixture either when dusk is detected and/or when motion is detected in a predetermined area. Other examples of luminaires include outdoor decorative lights which may be aligned with the architectural appearance of the house to which they are mounted.

Electrical power for an outdoor light fixture is provided by a power outlet/supply, such as an electrical junction box, which is usually a part of or attached to a surface, such as a wall of a building. The junction box typically includes hot (or live), neutral, and ground wires for connection to the luminaire. In most installations, the light fixture is wired directly or indirectly through a light fixture mounting box which is attached to the junction box in the wall of the house or other structure.

In some instances, an existing standard outdoor light fixture location is not amendable to upgrade or retrofit to a corresponding light fixture having increased functionality, such as a light fixture having wireless video and audio capabilities. The location may not be suitable for a full functioning lighting system which includes such features due to location of junction box, viewpoint or perspective of the positioning of the fixture or wiring location. Alternatively, the existing installed luminaire may be decorative and match the architecture of the structure to which is attached or may simply may be desirable by the homeowner. Further, costs of replacement of the luminaire with a fully integrated audio/video capable luminaire may be prohibitive. In certain configurations, it may also be burdensome for installers to retrofit existing light fixtures with traditional light mounting boxes or with standard junction boxes due to the mechanical and electrical connections involved between the junction box and the light mounting box, and between the light mounting box and the light fixture. Moreover, since each different type of the light fixtures typically requires a specific type of mounting box, installers may have to make sure they have the correct type of mounting hardware for a particular luminaire.

SUMMARY

The present disclosure relates to a universal retrofit light mounting box having increased functionality and particularly providing both audio and video features to a pre-existing installation for an outdoor luminaire. More particularly, a universal retrofit light mounting box is disclosed which may be connect directly to a conventional electrical power supply and which links to a local Wi-Fi connection for access. The system is designed to integrate with existing junction box cabling, such as Romex, permit convenient installations of various light fixtures, and combine wireless communication and audio/video surveillance capabilities into any existing light fixture and location. In embodiments, the wireless communication and audio/video capabilities of the universal light mounting box may be controlled using a smart phone or other mobile device running a specialized application for connectivity and operation of the retrofit unit.

Pursuant to the disclosed embodiments, a universal light mounting box for retrofit installation is described and is easily connected to hot, neutral, and ground wires from a junction box and can be mechanically secured to the junction box. Because the disclosed universal mounting box is small and light, the installation may be easily accomplished by an installer or DIY home owners. In addition, different kinds of light fixtures may be readily mechanically installed to the universal mounting box, as the installation utilizes existing electrical connection of the hot, neutral, and ground wires between the light fixture and the power supply.

Among embodiments, the presently described system includes an integrated communication module and camera housing which connects directly to an existing exterior luminaire and utilizes the currently available power supply wiring. Some embodiments may also be directed towards retrofitting a security light with different control strategies for light activation. For example, some embodiments of the light activation control strategies may include dusk to dawn control, scheduled control, manual control, geolocation control, and triggering from remote sensors (e.g., light sensors, motion sensors, doorbells, or door opening sensors, etc.). These and other benefits may be recognized through study of the following drawings and description.

In some embodiments, the universal retrofit light mounting box may include a canopy housing affixed to a junction box mounting plate and a fixture mounting plate, the canopy housing having a central aperture at least partially covered by the fixture mounting plate. The canopy housing can have an interior electronic housing and a depending control cable extending from the canopy housing to a camera housing and be operably or mechanically affixed to a junction box by the junction box mounting plate. The canopy housing is further attachable to an external luminaire by the fixture mounting plate which can be affixed or attached thereto by the plate. The canopy housing includes both a front surface and rear surface with the fixture mounting plate adjacent the front surface and the junction box mounting plate adjacent the rear surface. The camera housing may include at least a camera, a speaker, and a microphone in electronic communication with a microprocessor and be attached to the electronics housing by a depending cable. The microprocessor may be in electronic communication with a communication module, at least one trigger device, at least one switch operable to control electrical power to the external luminaire. The mounting box may also have a first electrical connector connected to a power source and a second electrical connector providing switched output power to the external luminaire.

These and other aspects may optionally include one or more of the following features.

In some implementations, mounting box may have both the first and second electrical connector include a reusable quick connect connector. In some of these implementations, the quick connect connector may be a plug connector. In other implementations, the reusable quick connect connector is a rotational connector.

In other implementations, the at least one communication module, camera housing, trigger device, controller may be positioned remotely from the canopy housing by wired or wireless connection. In still further embodiments, the controller may include a microprocessor and associated storage. In even further embodiments, the communication module may receive instructions from an external server. For example, an external server may be in communication to the communication module through the internet and through wired or wireless connections. In some implementations, the communication module communicates to the internet through an router, the router sending and receiving data to the external server.

In embodiments, the light mounting box may provide switched output power which is a switched electrical connection to the external luminaire, the switched output power further controlling illumination intensity of the external luminaire. The illumination intensity in some implementations may be at least a first illumination intensity, a second illumination intensity when the external luminaire is illuminated. In further implementations, the controller may be configured to transmit data to a remote device through the communication module. For example, the remote device may be a smart phone or computer of a user and the communication module communicates via the Wi-Fi connectivity to the device. In other implementations, the communication module communicates to a router and the internet to a server which can communicate to a user's smart phone device. For example, the user may have an account at a server which allows control of external luminaires and which also at least receives audio and video data which can be sent to the user's smart phone device through the server.

In other implementations, the controller may be configured to modify electrical power to the second electrical connector in response to receiving a signal from the trigger device in response to a triggering event. For example, the second electrical connector provides power to an external luminaire and can turn on/off the illumination of the luminaire. In other examples, the controller may modify the output characteristics of the light output of the luminaire. In instances, the controller may adjusts the light intensity of said at least one luminaire in response to receiving a signal from the trigger device in response to a triggering event. For example, the controller may receive a signal from a triggering sensor, such as a motion sensor. In still further implementations, the controller may be configured to close the switch upon such predetermined condition.

In embodiments, the at least one trigger device may be at least one of a motion sensor, door contact sensor, pressure sensor, break beam sensor, sound activated sensor, mail box alert, garage door sensor, and light switch.

In aspects, the retrofit light mounting box may have a first electrical connector and a second electrical connector attached to a threaded connector operable to be installed and in electrical contact with a screw-in electrical socket and which is operable to receive a threaded bulb. For example, the retrofit light mounting box may be electrically connected to a standard light bulb socket and receive electrical power therefrom. The connector may also allow for threaded attached to a screw-in bulb and control illumination of the bulb based upon the controller of the mounting box.

In other aspects, the controller may receive a triggering event from the at least one trigger device and then may transmit over the communication module a signal to a remote device with triggering event data including a unique trigger device identifier. For example, the triggering even may be a motion trigger and may transmit both audio and video along with the triggering even data. In still further embodiments, the controller can receive a triggering event from the at least one trigger device and then transmit over the communication module to a server, where the server is operable to receive a triggering event data, determine a remote device associated with a user account stored in said server, and push a notification to said remote device. In some implementations, the remote device is configured to control said trigger device using said at least unique trigger device identifier. In still further implementations, the remote device can control the trigger device through said server or directly by communicating with the communication module.

The above description is provided as an overview of some embodiments of the present disclosure. Further description of those embodiments, and other embodiments, are described in more detail below.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The term "controller" or "processor" is used herein generally to describe various apparatus relating to the operation of the system and the appliances referred to herein. A controller can be implemented in numerous ways (e.g., with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), programmable logic controllers (PLCs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some embodiments, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "Internet" or synonymously "Internet of things" refers to the global computer network providing a variety of information and communication facilities, consisting of interconnected networks using standardized communication protocols. The mounting box referred to herein may be operatively connected to the Internet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a universal light mounting box with audio/video functions will now be described by way of examples. These embodiments are not to limit the scope of the claims as other embodiments of a universal light mounting box with audio/video functions will become apparent to one having ordinary skill in the art upon reading the instant description. Non-limiting examples of the present embodiments are shown in figures wherein:

Figure 1:
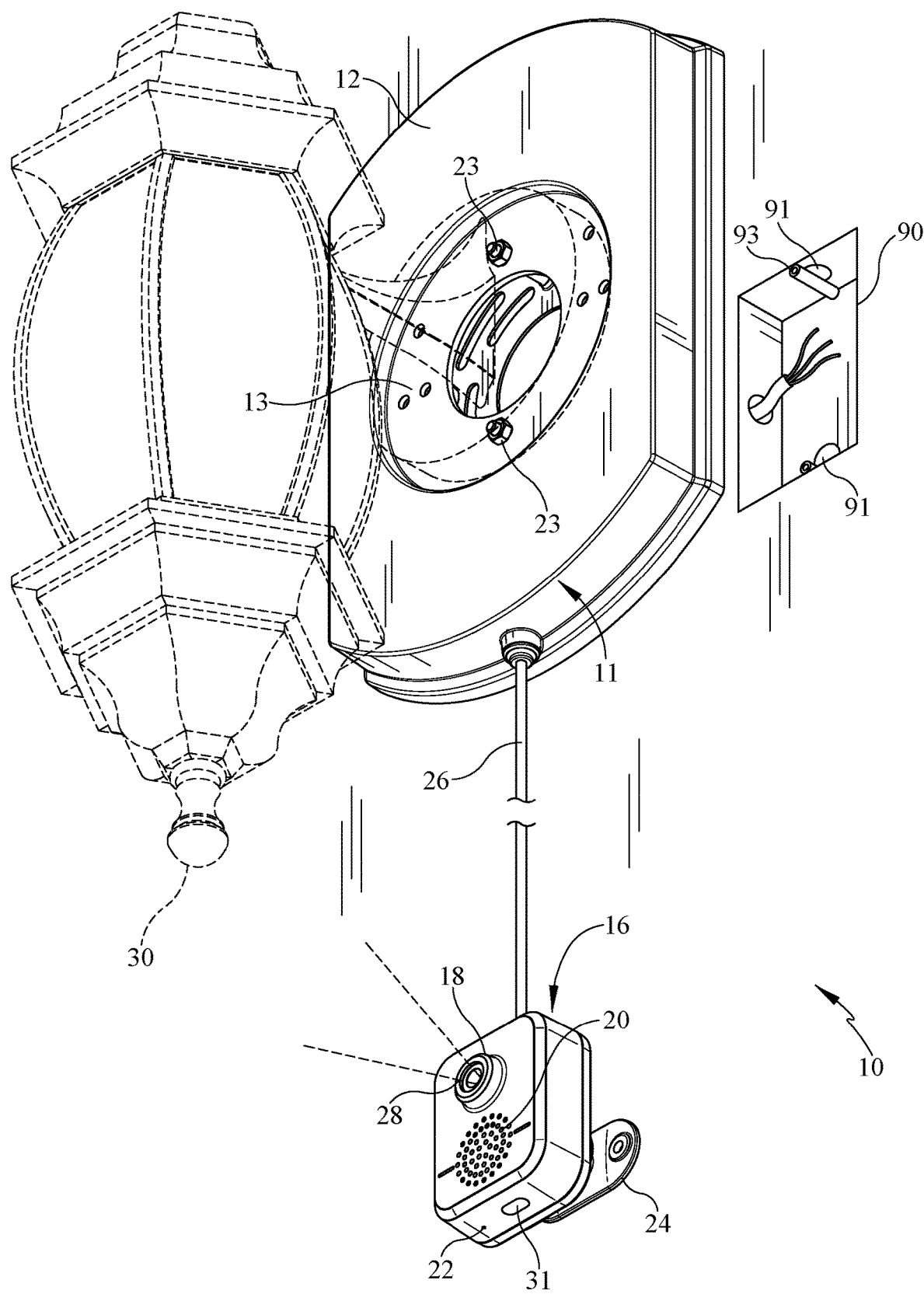
FIG. 1 is a front perspective view of an embodiment of a universal light mounting box with audio/video functions described herein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

It is to be understood that a universal light mounting box with audio/video functions is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to only physical or mechanical connections or couplings.

Figure 2A:
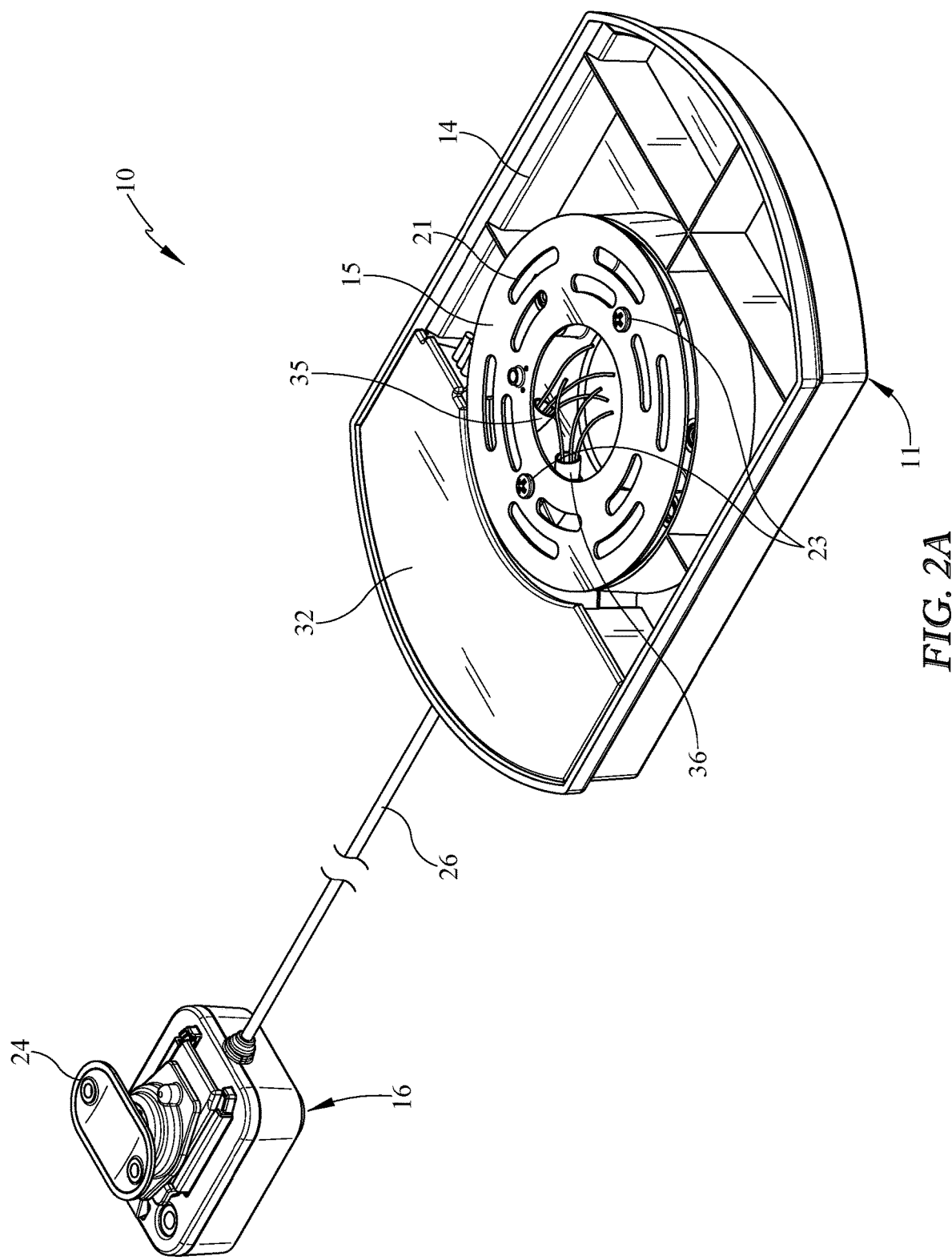
FIG. 2A is a back perspective view of an embodiment of the universal light mounting box with audio/video functions described herein.
Figure 2B:
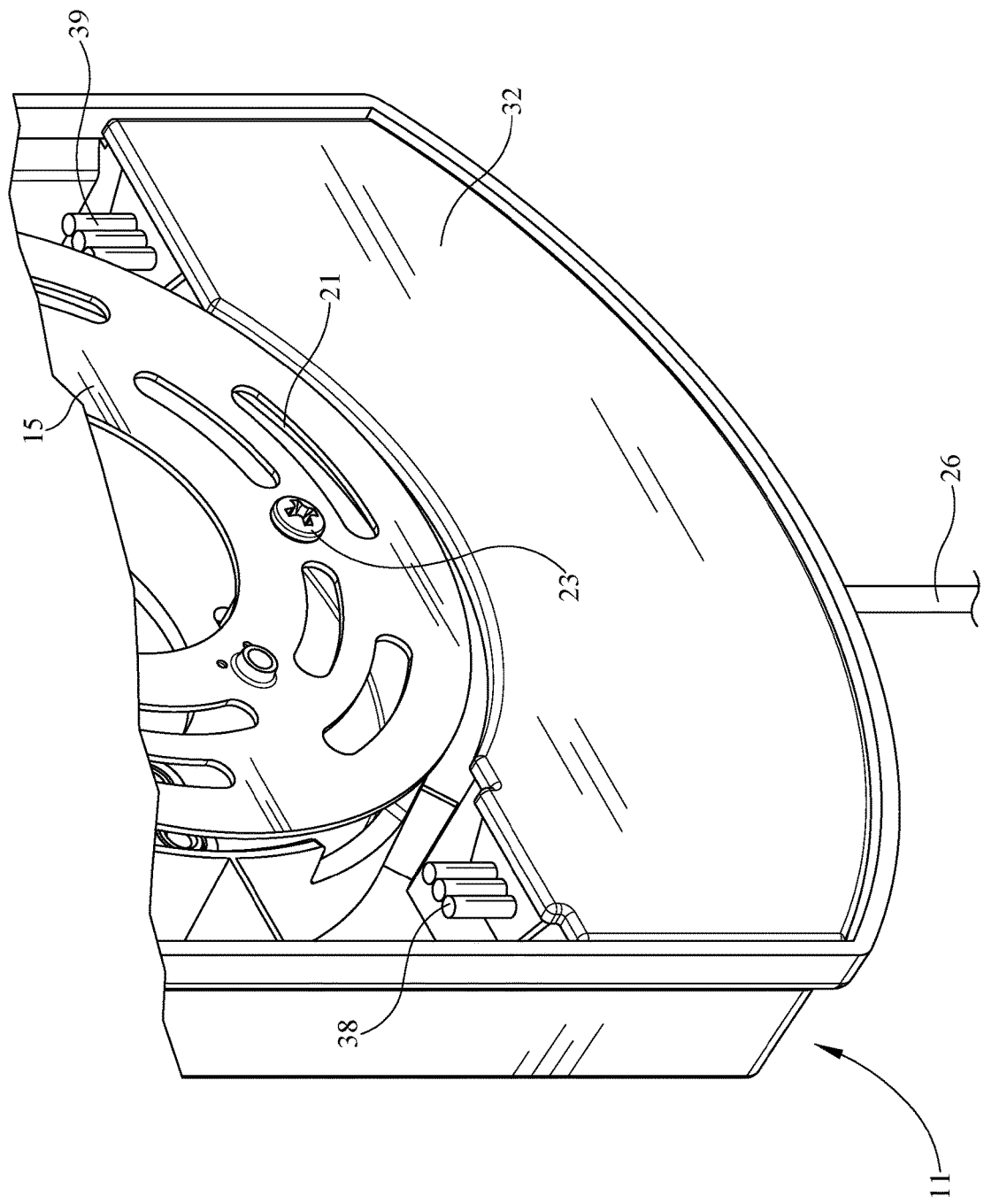
FIG. 2B is a close up view of an alternative electrical connection for mounting box described herein.

Turning to the figures, FIGS. 1 and 2A illustrate the front and back perspective views of an embodiment of a universal retrofit light mounting box with audio/video functions described herein. Included in this embodiment is a mounting box 10 comprising of a canopy housing 11 with a front surface 12, a back surface 14, and a camera housing 16 tethered to the canopy housing 11 via a cable 26 (e.g., a USB cable). The camera housing 16 may include a camera 18, a speaker 20, a microphone 22, and a camera housing mounting plate 24. Via the wired connection 26, the mounting box 10 may provide power to and also control the operation of the camera housing 16 and the various electronic components contained therein. In some embodiments, the camera housing 16 may be connected to the canopy housing 11 wirelessly (e.g., via radio signals, Wi-Fi signals, or cellular signals, etc.). For example, in some implementations, the camera housing may be wireless and communication with a controller in an electronic housing 32 of the canopy housing and have a separate power source or supply. In some embodiments, the camera housing 16 may be mounted within or integrated to the canopy housing 11 itself. For example, various camera housing components may be integrated into the electronic housing 32 (as shown in FIGS. 2A and 2B) of the canopy housing 11, rather than connected to the canopy housing 11 via a wired or wireless connection. For example, in some implementations, the camera housing 16 may incorporate only the camera or speaker while other associated electronic components are located within the canopy housing 11. In still further implementations, the camera lens may be placed in the camera housing but the associated electronics for processing the video input may be located within the canopy housing 11. However, for beneficial viewing of the camera and reduction of possible glare from the light of the external luminaire, separate location of the lens and camera from the canopy housing may be beneficial.

The back surface 14 of the canopy housing 11 may include a first electrical connector 35 for electrically connecting to a power supply, and the canopy housing 11 may include a second electrical connector 36 for electrically connecting to an external light fixture. The controller can control the supply of electrical power to the external light fixture as determined by control logic. Further, the various components of the electronic housing and the camera housing may be powered by the first electrical connector 35 and the electricity received therefrom. The details regarding the first and second electrical connectors will be described in the following paragraphs.

The camera 18 may be used for capturing digital video and images. As used herein, the term "digital images" can refer to any type of digital file obtainable by the camera 18, including but not limited to, still images, video images, audio, and combinations thereof. Digital images may also include other information/metadata associated with the image, such as time stamps (e.g., information identifying the date and time the image was captured), location stamps (e.g., information identifying the particular camera that captured the image and/or the location of the camera), and operation stamps (e.g., information identifying the event that triggered the camera to capture the image). In some embodiments, the camera housing 16, which is connected to the canopy housing 11 via a wired or wireless connection, may be affixed to a location using the camera housing mounting plate 24 (e.g., a mounting bracket). The location may be nearby with clear illumination proximity to an external luminaire and also in an entrance for a house to provide a clear image of persons or vehicles. In some embodiments, the camera housing 16 which is mounted within or integrated into the canopy housing 11, may still maintain adjustability so that the lens of the camera 18 may be directed to specific points of interest. It should be understood that the mounting box 10 may include multiple camera housings 16 including multiple cameras 18.

In some embodiments, the camera 18 may use the light generated by the associated light fixtures installed in the canopy housing 11 to operate and perform in low light conditions. In some embodiments, the camera 18 may be used as a light sensor to sense or determine light levels. Additionally and/or alternatively, the camera 18 may operate in connection with one or more light sensors to detect whether light levels are suitable for capturing digital images. For example, the light fixtures installed in the canopy housing 11 may be configured to automatically turn on when the ambient light in the area becomes too low as detected by the camera 18 or a light sensor embedded in the device or as determined by sunrise and sunset times as compared to local times and/or adjusted by the user.

In some embodiments, the camera 18 may be used as a motion detection system by executing known image analysis techniques to trigger the light to increase in brightness when motion is detected (e.g., as the presence of people, objects or devices). In some aspects, when motion is detected, the camera 18 may capture a series of images and/or video of the area and store the files in a memory (either locally on a storage device or remotely, e.g., via the internet). In some embodiments, the camera 18 may monitor and/or perform analytics such as facial recognition and the detection of specific vehicles and objects using known techniques. In other implementations a standard motion detector may be combined with the camera housing, such as a PIR or other motion detection system to provide input to the controller.

The speaker 20 and the microphone 22 may be used to facilitate real-time two-way conversations between a home owner and a visitor along with video data received from the camera 18. For example, an audio communication system comprising the speaker 20 and the microphone 22 may function as an integrated component of mounting box 10 to receive and deliver sounds from home owners and visitors.

The audio communication system may also be used as an audio sensor to detect sounds or other changes in audio level in a surrounding area. In this manner, mounting box 10 may be able to effect operation in response to the detection of certain sounds or changes in audio. For example, the mounting box 10 may be configured to activate a notification in response to detecting footsteps or voices in surrounding areas. It should be understood that the mounting box 10 may include multiple speakers 20 and microphones 22 located in various components.

In some embodiments, the mounting box 10 may include other components, such as a motion sensor and/or a light sensor. For example, as shown in FIG. 1, a motion sensor 28 may be located next to the camera 18 of the camera housing 16. In some embodiments, the motion sensor 28 may be directly located in the canopy housing 11, with fully operational motion sensing electronics located in the electronic housing 32. The motion sensor 28 may incorporate the use of multiple or single mounted passive infrared sensor (PIR), radar, sonic and/or laser range finding, among various technologies known to electronically determine movement of people and/or animals. Such technology may include heat signatures, range finding and/or distance measurement algorithms and other techniques which may be electronically implemented in the motion sensor 28, combined with electronics of the mounting box 10. By electronically connecting the motion sensor 28 to the control electronics of the mounting box 10, both wired and non-wired connections may be supported.

In some embodiments, the mounting box 10 may incorporate additional sensing devices such as a light (optical) sensor (e.g., a photocell) to determine ambient light levels, allowing the associated light fixtures to come on at dusk. For example, as shown in FIG. 1, a light sensor 31 may be located on the base end of the camera housing 16. In some embodiments, the light sensor 31 may be directly located in the canopy housing 11, with fully operational light sensing electronics located in the electronic housing 32. The light sensor 31 may also be combined with other location finding techniques to determine location and time zone and correlating location with pre-determined or calculated sunset and sunrise times. For example, upon access to an internet connection, a communication module could obtain location information and also automatic sunset and sunrise information daily for such location. Alternatively, the lighting controller may have associated electronics and memory to allow programming of customer/installed desired on/off times after dusk, illumination on times after sensing motion, full dusk to dawn illumination, partial or lower light intensity dusk to dawn illumination for the entire period or for user defined periods, modification of intensity levels, or other customer desirable modifications. Further, the lighting controller may further be configured to sense a hard 'reset' or active 'on' by manual switching off then on of the power at the switch by the user. All of such features may be incorporated into the lighting controller programming where a microprocessor executes instructions stored in an associated memory, or in alternative or combined configurations, some or all features may be implemented with associated circuit controls incorporated into the controller.

In some embodiments, it may be desirable to allow the user to reprogram the associated control parameters of the mounting box 10, including but not limited to, the delay times and sensitivity for triggering of the motion sensor 28, the light intensity levels, color, color temperature, and color sensitivity for triggering of the light sensor 31, as well as other control parameters such as on times and lower illumination times and/or levels. Such reprograming may be implemented on the mounting box 10 itself, or may be readily implemented by a user through a mobile programming device, such as a phone or dedicated remote control. Such reprogramming capability may utilize a communication channel for both transmission and receiving commands from a remote source or server or directly from a user device. Corresponding applications may be implemented for modification of such features on a user mobile device.

In some embodiments, the electronic housing 32 may also include a microprocessor/controller 52 and a communication module 58 embedded in the electronic housing 32. The controller and communication module allow communication with other devices (e.g., a Wi-Fi router) to establish a wired or a wireless connection according to various communication standards (e.g., Ethernet, Wi-Fi, Bluetooth, or ZigBee) between the mounting box 10 and a remote device (e.g., a smart phone, server, etc.). In some embodiments, the communication module 58 may be located in the electronic housing 32 of the canopy housing 11. In some embodiments, the communication module 58 may be in a separate location from the canopy housing 11. For example, the communication module 58 may be located in the camera housing 16 connected by wire or wirelessly to the canopy housing 11 and other electronics within the electronic housing 32. The communication module 58 may be, for example, a Wi-Fi microchip with full TCP/IP stack and microcontroller capability. The communication module 58 may allow the microcontroller 52 embedded in the electronic housing 32 to connect to the internet and make simple TCP/IP connections using Hayes-style commands. The communication module 58 may also allow the mounting box 10 to transmit data through the internet to various servers or other devices. For example, the communication module may allow for streaming video or images captured from the camera to be sent to a remote server. In other implementations, the communication module may connect directly by local communication protocols to transmit video and audio directly to a user device, such as a computer or a smart phone.

In various implementations, the communication module and the controller may be integrated. For example, a microcontroller may be provided with processing capabilities and also include an embedded wireless controller chip. In still further examples, multiple electronic elements may be integrated or separated. For example, a lighting controller may be integrated with communications module into a single chip. Additionally, the controller may also include digital video and audio processing capabilities, or be connected to a specialized chip to process the signals received from the camera module to transmission by the communication module. In other implementations, a communications module may be separated from a simple LED controller which effects control of light output signals to the luminaire. In even further implementations, the microprocessor/controller may be excluded from the control electronics of the system and the retrofit system may simply have a switch or other control device to activate and deactivate the luminaire light output, dim the light output or otherwise modify the electrical output signal to the luminaire.

It should be understood that various control functions may be achieved with the help of the communication module. For example, a user may use a smart phone to communicate to the mounting box 10 using the communication module to select and/or modify ON time after the motion sensor 28 detects motion while also selecting the illumination intensity, such as dimming the illumination levels slowly during change in state. In alternative embodiments, the user may use the smart phone to communicate to the mounting box 10 using the communication module to select and/or modify the specific colors utilized by the associated light fixtures, if supported, may also select and/or modify the color temperature.

Figure 3:
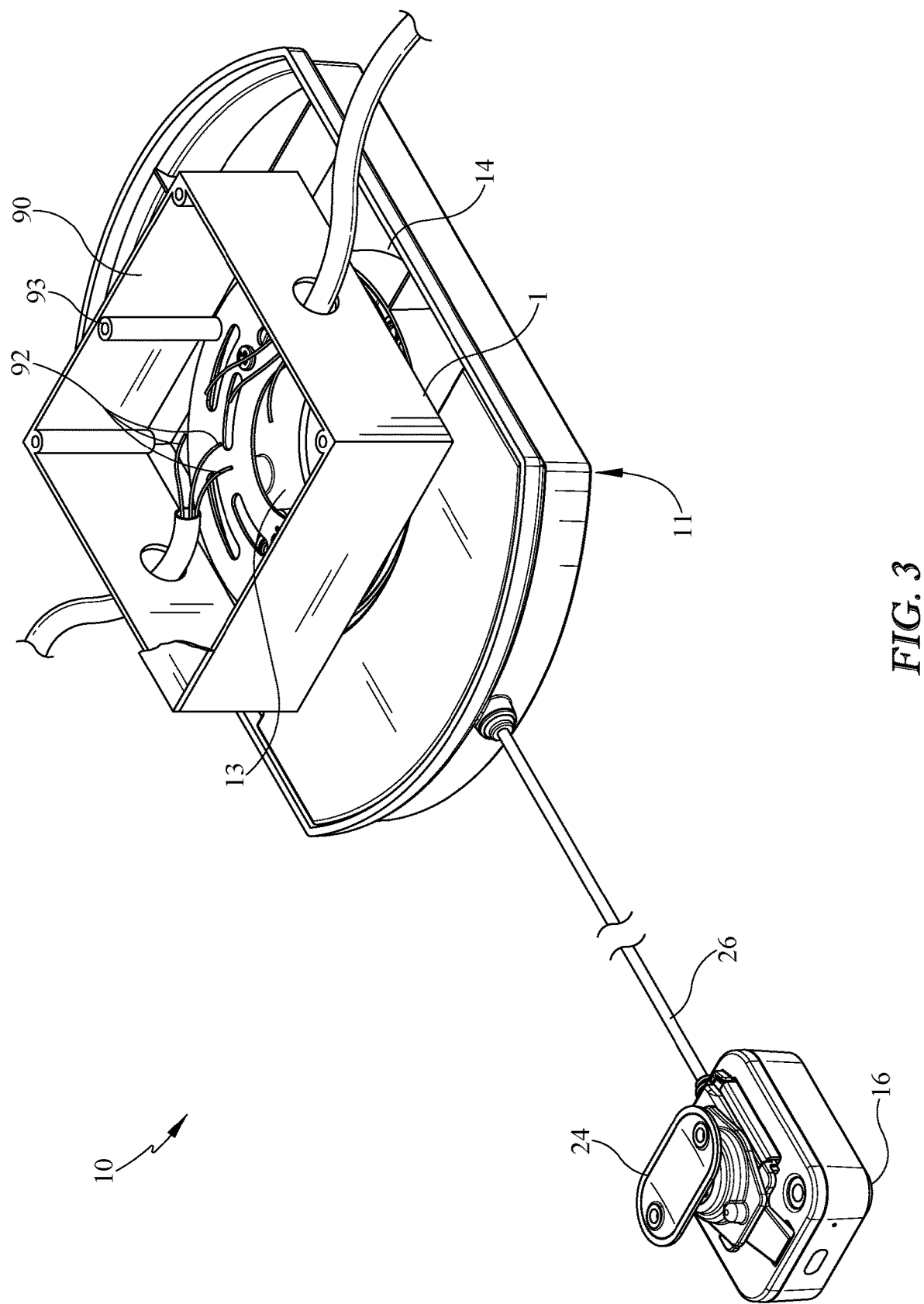
FIG. 3 is a back perspective view of an embodiment of the electrical junction box with the universal light mounting box with audio/video functions described herein.

FIG. 3 illustrates an embodiment of the mounting box 10 affixed to an associated junction box 90. It should be understood that the mounting box 10 may be installed into other types of power supplies and multiple embodiments may be appreciated for mechanically and electrically connecting the mounting box 10 to various power supply which supply power to the mounting box 10, the associated components, and the associated light fixtures. The fixture mounting plate 13 on the back surface 14 of the canopy housing 11 may be adapted for mechanically installing to the junction box housing 90. In some embodiments, the canopy housing 11 may be mechanically connected by screwing the mounting plate to the junction box 90. Such installation allows for the attachment of the canopy to the junction box 90 or adjacent structure on the wall in which the junction box 90 is installed. Further, the cables within the junction box 90 may be connected to the first electrical connector 35 to provide line voltage to the mounting box and the embedded electronic components. The first electrical connector 35 may be connected to Romex wires 92 (the 120V AC hot, neutral, and ground wires) from the junction box 90 which are threaded through junction box aperture 91. In this embodiment, typical mounting structures bars may be provided to allow for the canopy housing 11 mounting to the junction box 90 on a surface of a building, such as on a ceiling, wall, or other structures. For example, screw sleeves 93 positioned on the interior of the junction box 90 receive mounting screws to fasten the luminaire directly to the junction box 90. It should be understood that in this embodiment, any commonly known method of electrically connecting a wire may be used, including, but not limited to, clamping, soldering, clipping, the use of screw terminals, insulation displacement connections, control block style pushing arrangements, or any other method or apparatus. For example, the first electrical connector 35 may be twist cap connected to the double insulated multi-conductor cable, oftentimes referred to as ROMEX. Electrical connectivity may be carried out in normal fashion between the wires and while also connecting the second electrical connection to the external luminaire.

It should be understood that the canopy housing 11 may be made of a metal, plastic, or other similar materials utilized by those having skill in the art. If the canopy housing 11 is made of a metal or similar electrically conductive material, it should be understood there may be a need to avoid a short circuit with the junction box 90. In the event canopy housing 11 is made of a non-electrically conductive material, a separate grounded portion must be provided.

In some embodiments, the canopy housing 11 may be mechanically and electrically connected to the junction box 90 using a pair of quick connectors 38 and 39 of FIG. 2B. For example, the quick connectors 38 and 39 may be utilized for connecting the line voltage and the output voltage to the external luminaire where they both have associated quick connect male plugs. In some embodiments, the canopy housing 11 may be mechanically and electrically connected to the junction box 90 using other versions of reusable quick connect connectors, such as a rotational mechanical and electrical connector, which is similar to the plug version connector. The implementation of plug, rotational, or other versions reusable quick connect connectors may reduce or eliminate the requirement of the complicated wiring procedure and one or more tools needed for connecting the Romex wires 92 from the junction box 90 to the canopy housing 11, thus saving the time, effort, and cost of installers.

The mounting box 10 may accept standard 120V AC line voltage provide by the junction box 90 and modify it accordingly to provide to the associated components and light fixtures. Such modifications may include AC to DC conversion, PWM drivers, smoothing or chopping circuits and the like as are well-known in the art to provide adequate power to the luminaire. For example, the mounting box 10 may have a standard converter to provide adequate and appropriate electrical supply to the luminaire via driving circuits.

Although limited embodiments are shown for the mechanical and electrical connections between the junction box 90 and the mounting box 10, it should be understood that a variety of mechanical and electrical connectors and methods may be used to fasten the mounting box 10 to the junction box 90 mechanically and connect the Romex wires 92 from the junction box 90 to the mounting box 10.

Figure 4:
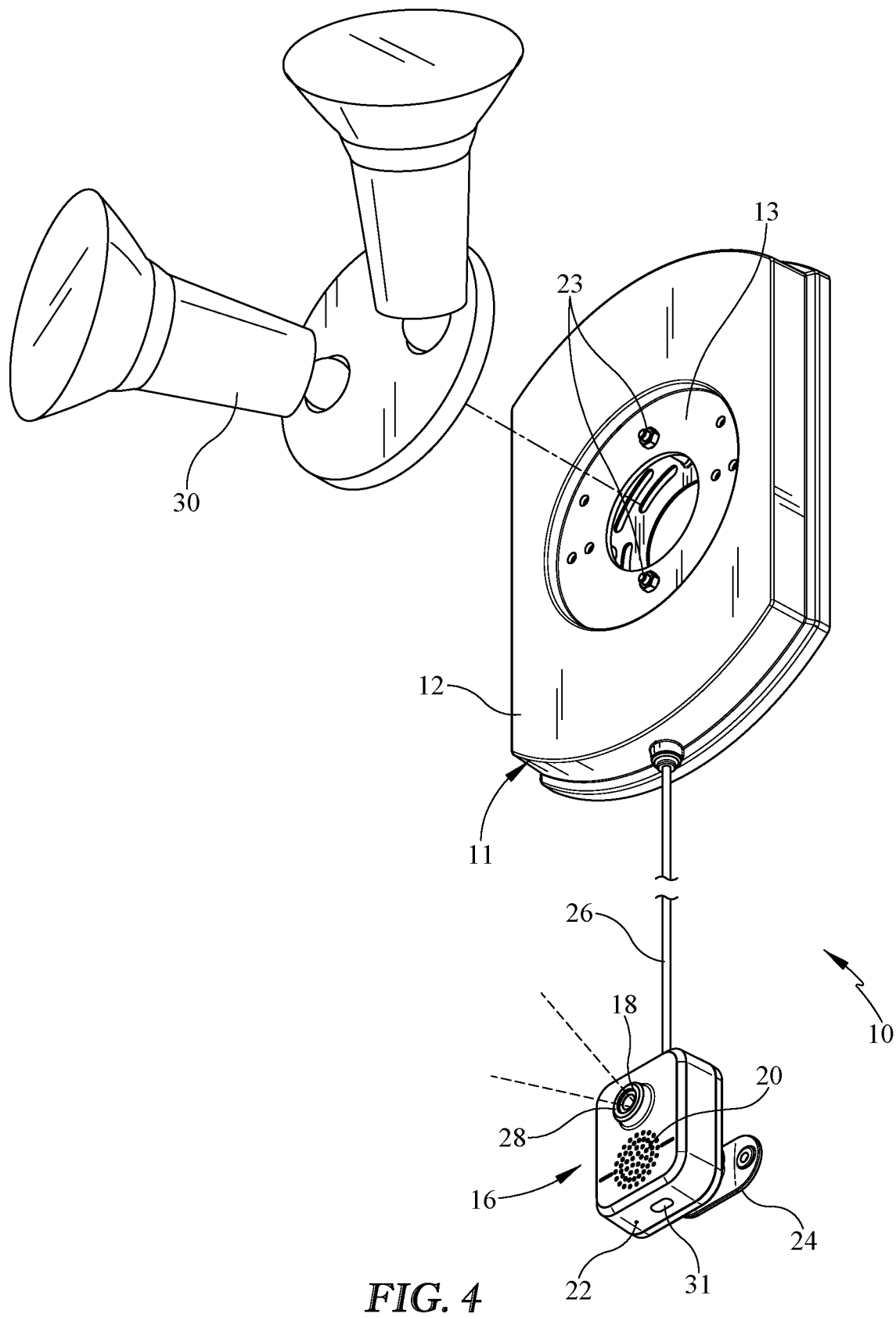
FIG. 4 is a front perspective view of an embodiment of connecting an exemplary outdoor light with the universal light mounting box with audio/video functions described herein.

FIG. 4 illustrates an embodiment of an exemplary luminaire 30 installed into the canopy housing 11 of the mounting box 10. It should be understood different luminaire 30 may be installed to the canopy housing 11, and multiple embodiments may be appreciated for mechanically and electrically connecting the luminaire 30 into the canopy housing 11. The front surface 12 of the canopy housing 11 may have an adjacent fixture mount plate 13 for mechanically connecting one or more luminaires 30. In some embodiments, the second electrical connector 36 may be connected to a standard outdoor light bulb socket. In some implementations, bolts or other screws 23 are used to fasten the mounting box 10 via the junction box mounting plate 15 directly to the junction box, or alternatively, affixation to the junction box mounting plate 13 which itself is directly affixed to the junction box 90.

In some embodiments, the first and second electrical connectors 35, 36 may be a reusable quick connect electrical connectors described herein to allow the luminaire 30 to be connected to the mounting box 10 without the requirement of the complicated wiring procedure and one or more tools needed for connecting the Romex wires 92 from the junction box 90 to the luminaire 30.

As shown in FIG. 4, fixture mounting plate 13 connects to a mounting plate or other mounting surface of a light fixture or luminaire 30. The luminaire 30 may be mechanically attached to, and electrically connected with the mounting box 10, by electrically connecting the switched second electrical connection 36, shown in FIG. 2A, with the luminaire wiring to provide switched electrical connection to the luminaire 30.

The mounting box 10 obtains power via the Romex wires 92 from the junction box 90. The Romex wires 92 is the power supply for both the external luminaire 30 and the electronics within the retrofit system. The first electrical connector 35 provides power to the electronics within the housing and all the necessary electronics. Internal power modification within the electronic housing 32 is accomplished as needed to supply the various outdoor mounting box electronics. For example, AC to DC converters, capacitors and other voltage and current modification techniques may be utilized. Switched pass through power is provided to the output second electrical connectors 36 leading to the external luminaire 30. Further output power modification may be accomplished by the system to the second electrical connection 36. For example, output power may be modulated to modify the output characteristics of the power while also effecting modification of the output light characteristics of the luminaire 30.

In some implementations, the electronic housing 32 may also include backup power supplies in case of power interruption. For example, single or multiple rechargeable batteries are provided in either camera or canopy housing. Further such backup power supply may also be utilized in case of inadvertent switching off of the power supply to the junction box. For example, if a homeowner after installation of the presently disclosed system accidentally switches off the light switch controlling the junction box 90 power supply, a backup power supply can be provided to power the system while also concurrently providing a 'power loss' signal to the user through one of the many communication channels. For example, the system may include a rechargeable backup power supply and the switch leading to the junction box 90 is turned off. The electronics detects the sudden loss of power, switches power to the backup power supply and sends a communication to the user's personal computing device. Such communication to the user can be directly, via the Wi-Fi communication module, audible via the speaker 20, or can be sent to an external server on which the user has an account which then transmits the message to the user's personal device, such as a smart phone.

The canopy housing 11 mounts to a junction box 90, as shown in FIG. 3, using the junction box mounting plate 15 and mounting plate apertures 21. The first electrical connectors 35 may include an electrical connector (e.g., a reusable plug wire connector with one or more fasteners) or may be directly affixed to standard copper wiring to which the luminaire was connected within the junction box 90. The luminaire 30 obtains electrical power via the second electrical connector 36. A Switch within the system electronics controls power to the external luminaire 30 as operated by the controller 52. Electrical power to the junction box 90 needs to be maintained so that the electronics of the system may properly activate and deactivate the external luminaire 30 while continually providing audio and video capabilities through a communication channel.

In some implementations, the first electrical connector 35 is directly connected to the Romex wires 92 within the junction box 90. As well, the second electrical connector 36 is directly connected to the wiring harness of the external luminaire 30. Both connections for the first and second electrical connectors 35 and 36 may be done by standard wiring twist connectors or other by mechanical connector. In other embodiments, the quick connectors 38 and 39 of FIG. 2B may be provided at the electronic housing for electrical connection input and output. For example, the electrical housing 32 may have a first plug-in receptacle 38 to receive power from the Romex wires 92. Further, the electronic housing 32 may also have a second plug-in receptacle 39 to send switched electrical output to the external luminaire 30. The second plug-in receptacle is in electrical connectivity with the switch and is controlled by the controller.

The luminaire 30 (e.g., a light bulb, an LED diode, etc.) may utilize various light sources such as LED, incandescent, halogen, CFL, or the like. For example, the luminaire 30 may be a color LED to provide variability in color and/or color temperature. Color may be implemented by various techniques including known color mixing of predefined color LEDs, modifying color output using luminescent materials, driving LEDs at varying intensity to meet color output requirements, among other known embodiments. The luminaire 30 may be controlled by various equipment including, for example, a local transmitter, a web based or app based control, a built in motion sensor/detector, and/or a built in light sensor/detector. Various embodiments for control drivers of the luminaire 30 may be utilized including microprocessors, the linear AC drivers are constant current regulators. In some embodiments, the linear AC drivers are ASICs. Other drivers may also be used. The luminaire 30 light output may be provided as arrays, individual emitters, any of which may be directly addressable and hence drivable by control and/or micro-processors and included programming stored on available and accessible memory. Such may include in embodiments, current regulators, voltage regulators, micro-controllers and other known circuitry to maintain illumination levels and other characteristics of the luminaire 30.

The luminaire 30 may be configured to illuminate at different light intensity levels. For example, the light source of the luminaire may be capable of dimming, or illuminating at a low/medium/high intensity level. In this manner, the luminaire 30 may operate at brighter light intensity levels in certain situations (e.g., when the camera 18 is obtaining digital images), at moderate intensity levels (e.g., to ensure that the motion detector is capable of detecting motion), at lower intensity levels (e.g., to provide track lighting), or at a zero intensity level (i.e., turned off). In some embodiments, user specified alternative modifications may further include flashing or blinking the luminaire 30 under predefined conditions. For example, in some embodiments, one or more luminaires or light source units within multiple or a singular luminaire may be programmed to flash intermittently to indicate an alert or warning condition, such as the detected interruption of power. Alternatively, a flashing alert or warning condition may be implemented by programming or user adjustment of controls by one or more illumination segments upon detection of motion while concurrently increasing illumination intensity of all illumination segments. Each of these specified user defined light output characteristics can be programmed and controlled by the controller with modification of the output power at the second electrical connector 36.

Control electronics such as one or more drivers and an integrated or individual light controller may be implemented in the mounting box 10 in order to control the luminaire 30, such as modify light output, control color temperature and/or brightness, among other light output characteristics. Such modification of light output characteristics may be implemented by modulation techniques including pulse width modulation, frequency modulation, amplitude modulation, embedded pulse code modulation for data inclusion, as well as others and combinations thereof. The controller and/or driver for the luminaire 30 may be integrated into a single electronic circuit and/or control processor are not necessarily required to be separated or integrated as either may be implemented, alone or in a combined configuration to control the light output of the luminaire 30. The respective modulated pulses from the driver, drivers, and/or controllers as well as possibly the baseline currents output by the driver circuits may be independently controlled by higher level logic of a system controller. In a digital controller example, such logic may be implemented by a programmable microcontroller, although those skilled in the art will recognize that the logic could take other forms, such as discrete logic components, an application specific integrated circuit (ASIC), etc. Additionally and/or alternatively, the luminaire 30 may be configured to operate at pre-programmed or pre-scheduled times.

It should be understood that multiple luminaires 30 in some implementations is connected to the mounting box 10. For example, multiple luminaires 30 may be connected to one or more relay switches integrated in the mounting box 10. The one or more relay switches may provide and control electrical power to each of the multiple luminaires 30 or individually addressable light sources at the one or more luminaires. It should be understood that a variety of methods may also be used to accommodate additional luminaires that are powered and controlled by the mounting box 10. Such variable deployed lights may allow users to modify/retrofit a plurality of lights with wireless control and audio/video functions.

Figure 5:
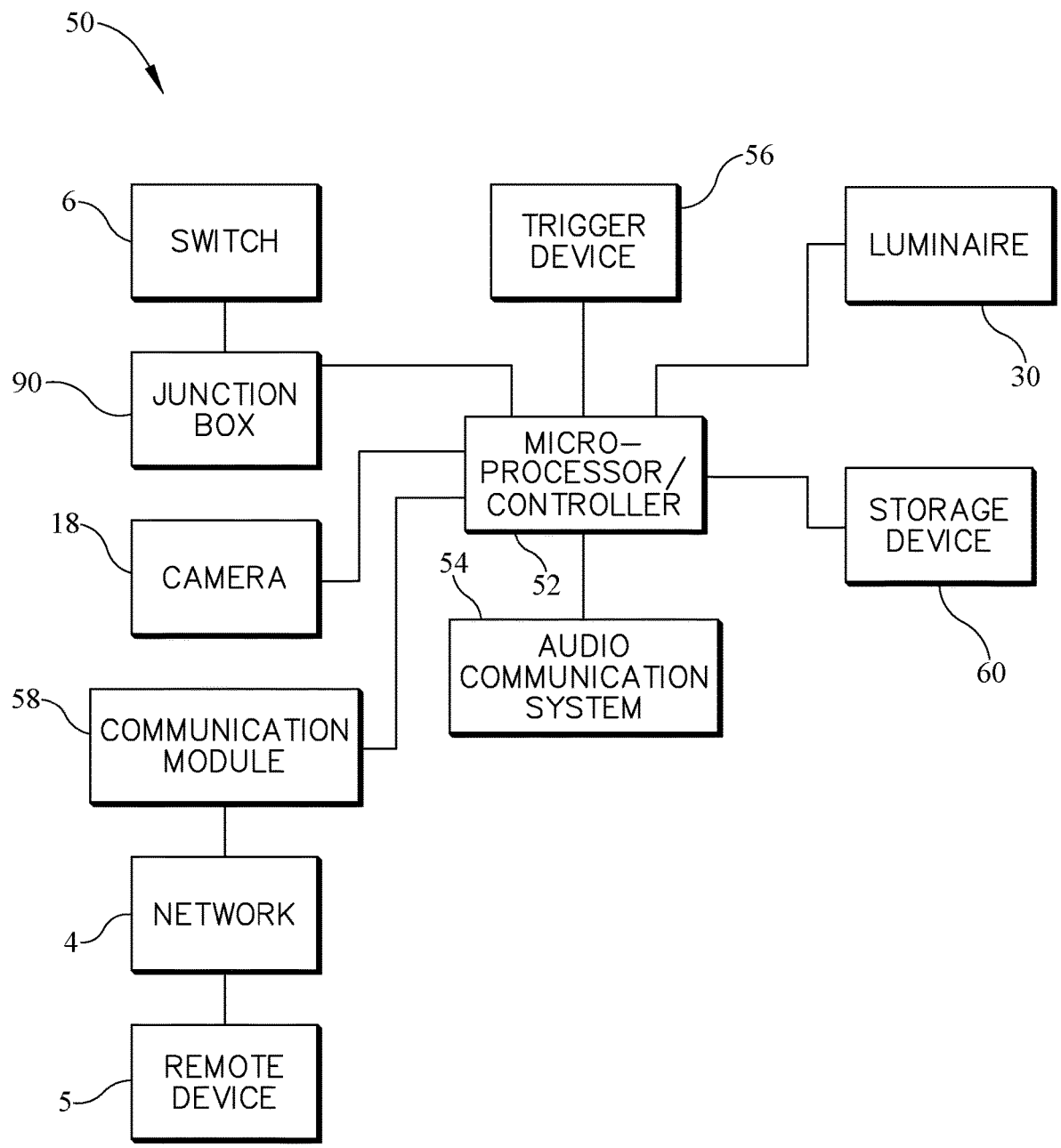
FIG. 5 is a block diagram of an embodiment showing interaction among components for a universal light mounting box with audio/video functions described herein.

Certain aspects of the present disclosure describe a communication and notification system integrated into a lighting system. FIG. 5 is a block diagram showing interaction among components of an exemplary lighting and notification system 50. As shown in FIG. 5, the system 50 may include a luminaire 30, a camera 18, a controller 52 (e.g., control circuitry, microprocessor, control board, electronic logic board or the like), an audio communication system 54 (e.g., the speaker 20 and the microphone 22 arrangement), a trigger device 56, a communication module 58, and a storage device 60. The trigger device 56 may include in implementations a motion sensor, door contact sensor, pressure sensor, break beam sensor, sound activated sensor, mail box alert, garage door sensor, or light switch. The storage device 60 may be a localized data storage device or a remote storage device such as a cloud-based storage system. Through the communication module 58, the system 50 may communicate with a network 4, (e.g., the internet), via wired or wireless communication methods. Through the network 4, the controller 52 and/or the system 50 may interact with a remote device 5, such as a smart phone, a tablet computer, or other personal computer devices and receive instructions therefrom or from an external control server associated with the user.

The communication module 58 may facilitate communication with the network 4 and/or the other components of the system 50. For example, the communication module 58 may include a radio transceiver, a Wi-Fi transceiver, a cellular transceiver, or the like, and can be used for locally (e.g., to the system 50 components) and/or remotely (e.g., through the network 4) transmitting and receiving information to various devices. In some embodiments, the controller 52 may use the communication module 58 to communicate with the network 4 and the components of the system 50; however, in other embodiments, the controller 52 may communicate directly with the components via a direct connection (e.g., a wired or wireless connection), without use of the communication module 58. In some aspects, the system 50 may not include a separate communication device, for example, where the controller 52 may include a communication device or other communication functionality integrated therein.

The network 4 may be any of a variety of networks that facilitate communication between remote devices and systems. For example, the network 4 can be the internet accessed via a wireless router or another network hub. The network 4 can also be a localized network that connects various systems and/or components of a home or community. For example, the network 4 may connect a lighting and notification system 50 with other home control systems, such as a lighting control system, an HVAC control system, an appliance control system, a home audio/video control system, a telephone system, a sprinkler system, a garage door monitoring system, a security system, and the like. In some embodiments, the network 4 providing the intra-home connectivity further connects to other networks, for example the internet, via wired or wireless connectivity methods, all of which are known in the art.

Via the network 4, the system 50, and in particular, the controller 52, may interact with various remote devices 5, such as a smart phone, tablet, personal or laptop computer, or other computing device with an interface capable of communicating with the network 4. In this manner, a user of the remote device 5 can send signals to the system 50, for example, by operating an application on the remote device 5 to interact with the system 50. Through the application, the user may be able to execute functionality, such as controlling the lighting levels of the luminaire 30, turning the camera 18 on/off, adjusting the position and/or orientation of the camera 18, communicating through the audio communication system 54, and authorizing access to a building.

The user may also be able to view digital images (which can include video) captured by the camera 18. In some embodiments, the remote device 5 may access digital images in real-time. For example, the user may be able to view a real-time video feed from the camera 18 via the remote device 5. Additionally and/or alternatively, the user may be able to view historically recorded digital images via the remote device 5. For example, the user may be able to access images stored on the storage device 60 or at a server 8. In some embodiments, the images stored on the storage device 60 or server 8 may be associated with other information, such as the time and date that the image was captured. In this manner, the user may be able to view activity that previously occurred, which may be useful, for example, in situations that gave rise to security issues.

In some embodiments, the controller 52 may be integrated into mounting box 10. For example, the mounting box 10 may have the electronic housing 32 (see FIG. 2) that includes control circuitry and/or other equipment that operate as the controller 52 to effect operation of the lighting and notification system 50. Alternatively, the controller 52 may be exterior to the mounting box 10, while still in communication therewith, for example, through a wired or wireless connection.

As used throughout this application, the term "effect" should be understood to incorporate either direct or indirect control over a function. For example, where the controller 52 "effects" operation of the luminaire 30, the controller 52 may either directly control the luminaire 30 via a direct connection to the lighting apparatus, or indirectly control the luminaire 30 by sending a signal that causes the apparatus (or an intermediary control apparatus) to adjust its lighting. Moreover, where the controller 52 "effects" capture of digital images by the camera 18, the controller 52 may directly control the camera 18 to capture images (e.g., in examples where the controller is integrated into a camera), or the controller 52 may indirectly control the camera 18 by sending an instruction signal that the camera 18 receives and processes to capture an image.

In those embodiments that the system 50 includes multiple luminaires 30, the multiple luminaires 30 may operate individually or operate together. When the multiple luminaires 30 operate together, the operation of one luminaire may depend at least partly on the operation of another. For example, the multiple luminaires 30 may be configured in a way that when one luminaire 30 turns on or otherwise adjusts, the other luminaires 30 automatically turn on, or otherwise adjust.

In some embodiments, the system 50 may not include a light sensor to detect ambient lighting levels. In various embodiments, the light level detection may be implemented through the communication module 58 and the network 4 obtaining location information for the system 50 and primary and secondary lighting units in order to determine sunset and sunrise information. For example, in embodiments, controller 52 may utilize communication module 58 to access the network 4, which in some embodiments may be a local Wi-Fi signal allowing access to the internet. Various known API's may be utilized which provide data to the controller indicating geographic location which may then be stored in storage device 60. In embodiments, third party geo-location lookup tools may receive IP addresses and lookup and identify generalized geographic locations associated with the IP address which may be returned via network 4 to the controller 52.

In some embodiments, the controller 52 may utilize the communication module 58 and network 4 to determine on/off times for the luminaire 30. The communication module 58 and the network 4 may include access, through Wi-Fi communication channels and a local network gateway, to the internet. The local Wi-Fi communication channel may include an IP address, such as for example an IPV6 address for the modem and/or local gateway, which is associated with the network, the IP address typically assigned by the internet service provider (ISP). The IP address may be utilized, in various embodiments, to determine the geographic region of the system 50 by allowing the controller to request, through an internet connection pathway, geographic information related to the assigned IP address. For example, in some embodiments, the controller 52 may periodically obtain the current IP address through a standard lookup call to the communication device and network. In some embodiments, this periodic verification may be once daily. The controller 52 may then through an API to transmit the IP address to a geo-location lookup tool which provides, in return via the API, geographic coding or related information. For example, in some embodiments, the geo-location lookup tool may return geographic location information related to time zone, postal code, latitude and longitude, local phone number prefix, state and/or city location information. Additionally and/or alternatively, the mounting box controller 52 may obtain a local time based upon user interface and the remote device 5 and/or from a system call through the audio communication system 54 and/or network 4. Once location information is obtained, in some embodiments, the controller 52 may utilize lookup tables stored in the storage device 60 to cross reference geographic identifiers of location with sunrise and sunset times. Alternatively, the geo-location lookup tool API may directly provide sunrise and sunset times or such times may be obtained through other API calls and/or directly in response to receiving the IP address.

For example, in some embodiments, the system 50 may determine the IP address for the internet connection on a daily basis. Once the IP address is verified and/or determined, the system may compare the prior returned IP address with the prior determined IP address. If such comparison differs, a call via the API may be made to determine the geolocation of the IP address and then to determine the sunset and sunrise times for the determined geo-location. The system may then store such information in the storage device 60. In various examples, API calls may be made to determine geo-location. Additionally and/or alternatively, API calls may be made to obtain sunrise and sunset times for the obtained geo-location. Such API call may be replaced with an internal lookup table functionality supported by the controller and information stored in the storage device 60.

In various examples, during use, the controller 52 may determine automated on/off times for the lights based upon known and/or determined geographic location, current local time and sunrise and sunset times. In some embodiments, these on/off times for the light sources may be modified by the user either directly at mounting box controller 52 and/or via a remote device 5. For example, a user may program automated on times for the various light sources at thirty minutes prior to sunset. Alternatively a user may allow the lights to turn on at the determined sunrise and to automatically turn off at the determined sunset times. Additionally and/or alternatively, the user may override any setting via direct control through the remote device 5.

In various embodiments, determined information collected through system calls, API's, determined through lookup tables and the like may be regularly verified and updated in the storage device 60. Thus, the system 50 may be able to control the various luminaires 30, cameras 18, and other system elements based upon current time information including taking into account time change status, movement of the system 50 to another location, or user settings via direct adjustment on the system hardware or through the user remote device 5, such as a smart-phone or similar computer devices.

It should be understood the electrical power supply, such as the junction box 90, may be controlled by a switch 6 (e.g., an electrical wall switch). The switch 6 may have to be kept on to provide constant electrical power to the mounting box controller 52 and associated components (the luminaires 30, the camera 18, the controller 52, the audio communication system 54, the trigger device 56, the communication module 58, and the storage device 60) and also the other possible components connected and/or connectable to the mounting box controller 52. It should be understood that a relay switch may be used to control the one or more luminaires through the mounting box controller 52.

As discussed above, by running an associated application on the remote device 5, notifications may be received indicating a triggering event at the various trigger devices 56 which have communicated conditions to the mounting box controller 52. Two internet communication method embodiments (local network and client-server network) through the communication module 58 of the mounting box 10 are described herein. It should be understood that other communication methods may also be used by the mounting box 10.

Figure 6A:
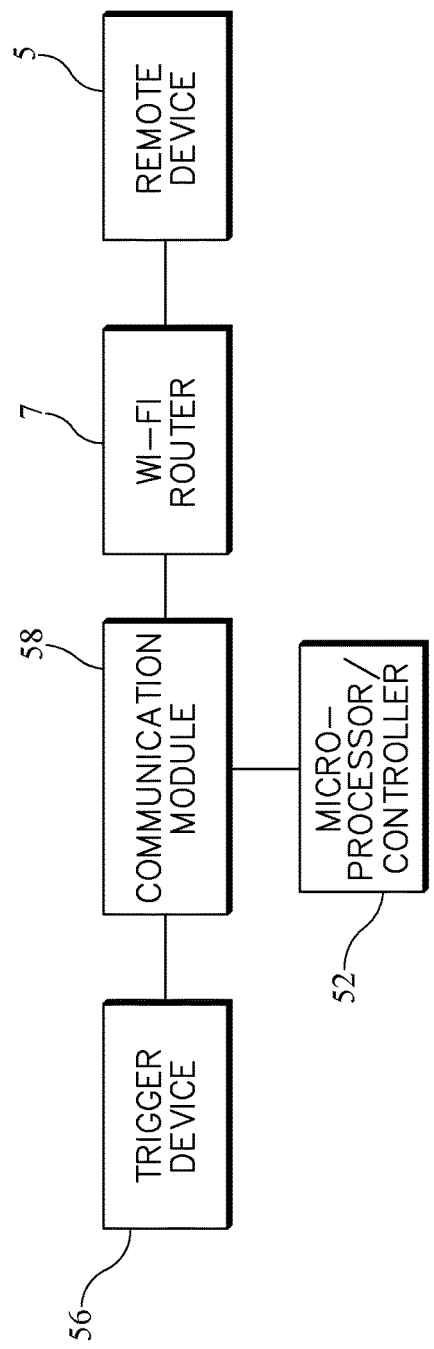
FIG. 6A is a block diagram of an embodiment for a communication path on a local network for a universal light mounting box with audio/video functions described herein.

In some embodiments, as shown in FIG. 6A, a mounting box 10 may include one or more trigger devices 56 (e.g., doorbells, light sensors, or motion sensors, etc.). The trigger device 56 is associated with the mounting box 10 and able to send activation signals to the mounting box 10 upon a defined triggering event. Trigger devices may be separated and external to the system and have their own power supply and communication systems. For example, multiple sensors may be integrated with the system for close communication therewith. Triggering events may include but are not limited to, a switch button depress, an optical indication, motion sensing, or other indications of activity. Each trigger device 56 may have a unique trigger device identifier (e.g., a predetermined IP address) which is being regularly monitored by the mounting box 10. In some embodiments, the local Wi-Fi communication channel may include an IP address, such as an IPV6 address for each trigger device 56, which is typically assigned by the ISP. The IP address may then be utilized by the mounting box 10 with the communication module 58 to forward indications upon the receipt of the triggering signals directly to an associated remote device 5 (e.g., a smart phone) through a Wi-Fi router 7. For example, a user may have the remote device 5 associated with the camera 18 with a particular IP address. Upon receipt of a triggering event signal or other indication (e.g., recognition of a guest face) from the camera 18, the mounting box 10 may push text messages or other notifications directly to the remote device 5 through the peer to peer Wi-Fi communication with the help of the Wi-Fi router 7.

Figure 6B:
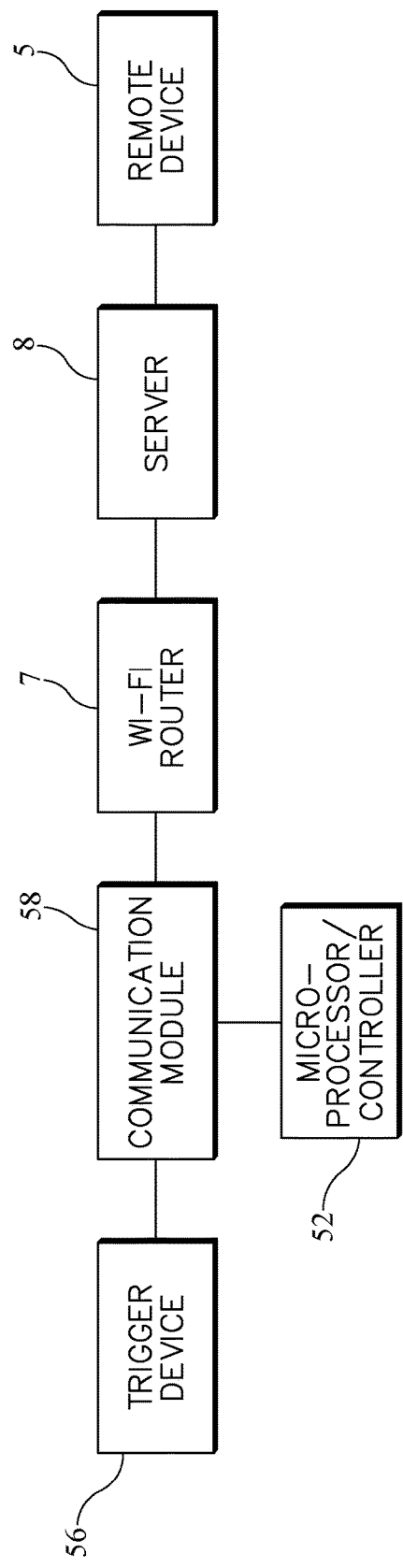
FIG. 6B is a block diagram of an embodiment for a communication path on a client-server network for a universal light mounting box with audio/video functions described herein.

In other embodiments, as shown in FIG. 6B, a mounting box 10 may also transmit data through the internet to a server 8 or other similar devices first instead of transmitting date to a remote device 5 directly. For example, upon the receipt of a triggering signal from a trigger device 56 as discussed above, the mounting box 10 may utilize the communication module 58 to send data to a user's account at the server 8 via a Wi-Fi router 7 first, then the user may associate the remote device 5 with the user's account at the server 8 and receive push type text messages or other notifications from the server 8 as configured by the user. The advantages of communicating through the client-server network are that all data is stored in a central location, and the user may access and utilize the centrally controlled data at a later time, which improve the control flexibility and the network security. The mounting box may also stream both audio and video to the server for transmission to the remote device 5 associated with the user's account. Supported interactions may also include two way communications, such as for example audio communications with the user's device.

In some embodiments, a user may identify multiple remote devices 5 which receive the push notifications. Within the configuration settings of the user installed application, the user may identify multiple remote device 5 that have the application installed. For example, three different remote device 5 may be associated with a single mounting box 10. Multiple remote devices 5 may be selected with unique USERID's. In various embodiments, the remote device 5 may be selectively associated with the mounting box 10 so as to additionally receive the push notifications resulting from triggering events at associated remote devices 5.

It should be understood that the communications shown in FIGS. 6A and 6B work both direction. That is to say, with the installed application in the remote device 5, the user may also control the mounting box 10 and associated trigger device 56 by utilizing the unique trigger device identifier or through the server 8.

Figure 7:
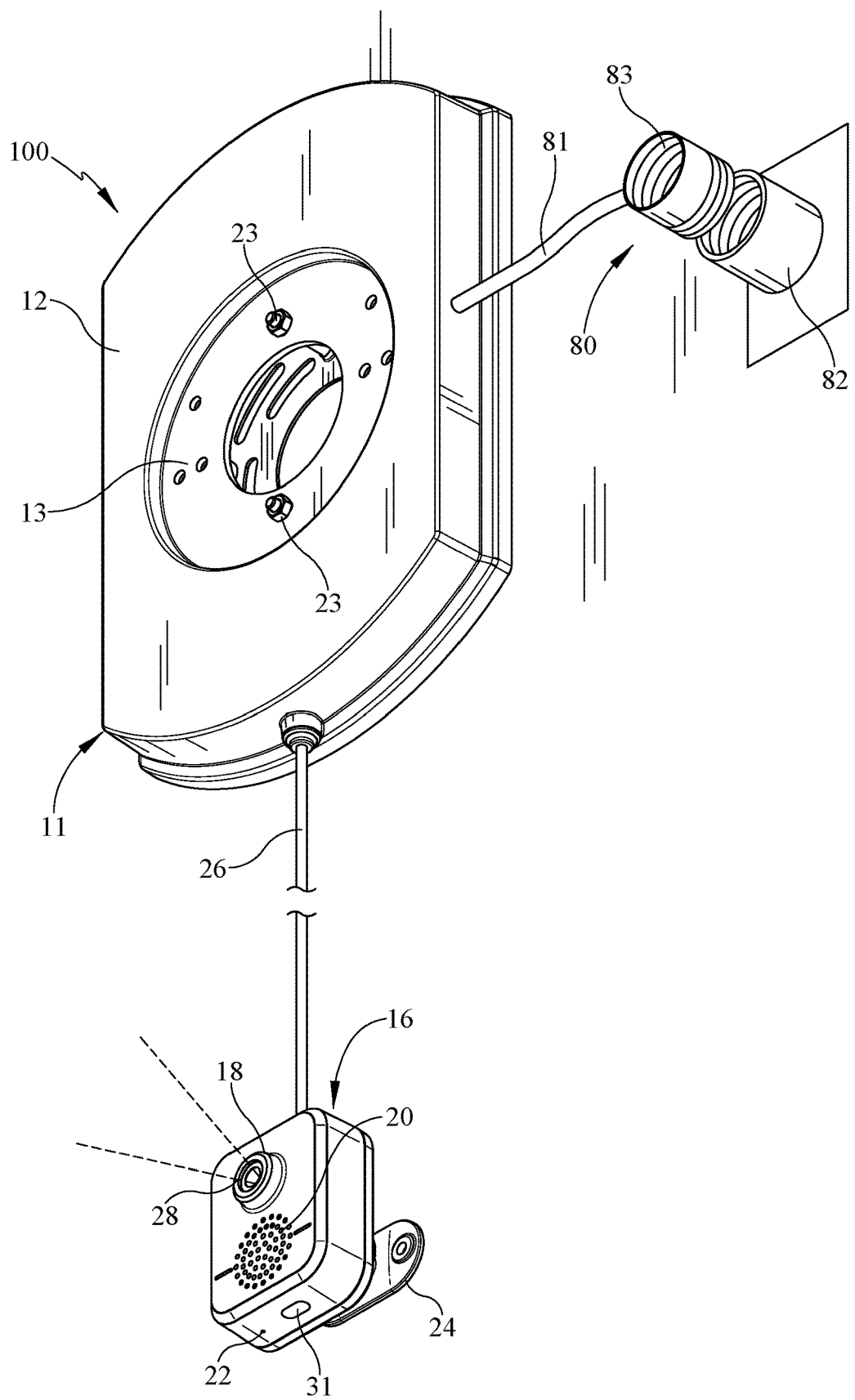
FIG. 7 is an alternative embodiment of the universal light mounting box of FIG. 1.

For example, as depicted in FIG. 7, an additional embodiment 100 of the retro fit mounting box is depicted which allows direct electrical connection to a bulb socket while mounting of the canopy housing 11 to the wall. In this example, instead of affixing the mounting box 100 to the junction box 90 (FIG. 3), it could be affixed to the wall while the electrical supply interface is with a standard bulb socket. The first and second electrical connectors 35 and 36 could be combined into a single electrical cord 81. The electrical cord 81 could be electrically connected to a Type-A series screw-in socket element 83. The screw-in socket element 83 receives electrical power from the screw-in connector and provides power to the electrical housing 32 of the canopy housing 11. Switched electrical output is also included within the electrical cord 81 to the screw-in socket element 83 and controlled directly through that screw-in socket type connector instead of utilizing the first and second electrical connectors 35 and 36. For example, the canopy housing 11 could be attached directly to a wall adjacent to a standard Type-A screw-in socket 82 having a Type-A screw-in socket element 83. The screw-in socket element 83 is electrically connected via electrical cord 81 to the electronic housing 32 of the canopy housing 11. Switched electrical power is provided through the electrical cord 81 by the switch 6 to the screw-in socket element 83. An external bulb may be screwed into a Type-A electrical receptacle formed in the element 83. In such an exemplary installation, no additional wiring need be implemented apart from connecting the connecting system 80 to the bulb outlet depicted in FIG. 7.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A universal retrofit light mounting box, comprising:
   a canopy housing affixed to a junction box mounting plate and a fixture mounting plate, the canopy housing having a central aperture at least partially covered by the fixture mounting plate;
   the canopy housing having an electronic housing and a depending control cable extending from the canopy housing to a camera housing;
   the canopy housing operably affixable to a junction box by the junction box mounting plate;
   the canopy housing attachable to an external luminaire by the fixture mounting plate;

the canopy housing having a front surface, the fixture mounting plate adjacent the front surface, the canopy housing having a back surface, the junction box mounting plate adjacent the back surface;

the camera housing having at least a camera, a speaker, and a microphone in electronic communication with a controller;

the controller further in electronic communication with a communication module, at least one trigger device, at least one switch operable to control power to the external luminaire;

a first electrical connector connected to a power source; and a second electrical connector providing switched output power to the external luminaire.

2. The universal retrofit light mounting box of claim 1, wherein each of said first and second electrical connector is a reusable quick connect connector.

3. The universal retrofit light mounting box of claim 2, wherein said reusable quick connect connector is a plug connector.

4. The universal retrofit light mounting box of claim 2, wherein said reusable quick connect connector is a rotational connector.

5. The universal retrofit light mounting box of claim 1, wherein the communication module, camera housing, trigger device, controller is remote from said canopy housing by wired or wireless connection.

6. The universal retrofit light mounting box of claim 1, wherein the controller has a microprocessor and an associated storage device.

7. The universal retrofit light mounting box of claim 1, wherein the communication module receives instructions from an external server.

8. The universal retrofit light mounting box of claim 7, wherein the communication module communicates through a router, the router sending and receiving data to the external server.

9. The universal retrofit light mounting box of claim 1, wherein the switched output power is switched electrical connection to the external luminaire, the switched output power further controlling illumination intensity of the external luminaire in addition to the switched output power, the illumination intensity being at least a first illumination intensity, a second illumination intensity when the external luminaire is illuminated.

10. The universal retrofit light mounting box of claim 1, wherein the controller is configured to transmit data to a remote device through the communication module.

11. The universal retrofit light mounting box of claim 1, wherein the controller is configured to modify electrical power to the second electrical connector in response to receiving a signal from the at least one trigger device in response to a triggering event.

12. The universal retrofit light mounting box of claim 1, wherein the controller adjusts the illumination intensity of the external luminaire in response to receiving a signal from the at least one trigger device in response to a triggering event.

13. The universal retrofit light mounting box of claim 1, wherein the controller is configured to close the at least one switch upon a predetermined condition.

14. The universal retrofit light mounting box of claim 1, wherein the at least one trigger device is at least one of a motion sensor, door contact sensor, pressure sensor, break beam sensor, sound activated sensor, mail box alert, garage door sensor, and light switch.

15. The universal retrofit light mounting box of claim 1, wherein the first electrical connector and the second electrical connector are attached to a threaded connector operable to be in electrical contact with a screw in electrical socket and which is operable to receive a threaded bulb.

16. The universal retrofit light mounting box of claim 1, wherein the controller receives a triggering event from the at least one trigger device and transmits over the communication module a signal to a remote device with triggering event data including a unique trigger device identifier.

17. The universal retrofit light mounting box of claim 16, the remote device is configured to control the at least one trigger device using the unique trigger device identifier.

18. The universal retrofit light mounting box of claim 1, wherein the controller is configured to receive a triggering event from the at least one trigger device and transmit over the communication module to a server, wherein the server is operable to receive a triggering event data, determine a remote device associated with a user account stored in the server, and push a notification to the remote device.

19. The universal retrofit light mounting box of claim 18, the remote device is configured to control the at least one trigger device through the server.

20. A universal retrofit light mounting box, comprising:
a canopy housing having a junction box mounting plate and a fixture mounting plate;
the canopy housing having a sealed electronic housing and a depending control cable extending from the canopy housing to a camera housing;
wherein the junction box mounting plate is attachable to an external junction box;
the fixture mounting plate is attachable to an external luminaire;
the canopy housing having a front surface, the fixture mounting plate adjacent the front surface;
the canopy housing having a back surface, the junction box mounting plate adjacent the back surface;
the camera housing having at least a camera, a speaker, and a microphone in electronic communication with a controller in the canopy housing sealed electronic housing;
the controller further in electronic communication with a communication module, at least one trigger device, and at least one switch operable to control power to the external luminaire;
a first electrical connector connected to a power source; and
a second electrical connector providing switched output power to the external luminaire.

21. A universal retrofit light mounting box, comprising:
a canopy housing having a junction box mounting plate and a fixture mounting plate;
the canopy housing having a sealed electronic housing and a depending control cable extending from the canopy housing to a camera housing;
wherein the junction box mounting plate is attachable to an external junction box;
the fixture mounting plate is attachable to an external luminaire;
the canopy housing having a front surface, the fixture mounting plate adjacent the front surface;
the canopy housing having a back surface, the junction box mounting plate adjacent the back surface;
the camera housing having at least a camera, a speaker, and a microphone in electronic communication with a controller in the canopy housing sealed electronic housing;

an electrical cord extending from the canopy housing to a screw-in socket element, the screw-in socket element having a threaded light bulb screw-in receiving socket;

the controller further in electronic communication with a communication module, at least one trigger device, and at least one switch operable to control power to the external luminaire;

a first electrical connector connected to a power source and in electrical communication with the screw-in socket element; and a second electrical connector providing switched output power to the external luminaire and in electrical communication with the threaded light bulb screw-in receiving socket.

\* \* \* \* \*